United States Patent
Sachs

[15] 3,662,713
[45] May 16, 1972

[54] MODULAR ANIMAL CAGE SYSTEM

[72] Inventor: Sidney Sachs, 50 Hobart Road, Paramus, N.J. 07652

[22] Filed: Nov. 18, 1969

[21] Appl. No.: 877,809

[52] U.S. Cl. .................................. 119/18, 119/15, 119/22
[51] Int. Cl. .................................. A01k 31/04, A01k 01/02
[58] Field of Search ............... 119/16, 17, 18, 19, 22, 28, 119/63

[56] References Cited

UNITED STATES PATENTS

| 541,600 | 6/1895 | Downey | 119/28 |
| 3,244,147 | 4/1966 | Kogeichi et al. | 119/18 |
| 3,292,582 | 12/1966 | Rubricius | 119/17 |
| 3,177,848 | 4/1965 | Rubricius | 119/17 |
| 3,278,248 | 10/1966 | Torok | 312/308 |
| 3,087,459 | 4/1963 | Dirck | 119/19 X |
| 3,456,618 | 7/1969 | Barlow | 119/18 |
| 3,285,226 | 11/1966 | Schuller | 119/18 |
| 3,294,065 | 12/1966 | Myers et al. | 119/25 |
| 3,361,116 | 1/1968 | Daniel et al. | 119/63 |
| 3,429,297 | 2/1969 | Schroer | 119/17 |
| 3,087,458 | 4/1963 | Bennett, Jr. | 119/17 |

FOREIGN PATENTS OR APPLICATIONS

3,087,458    4/1963

*Primary Examiner*—Aldrich F. Medbery
*Attorney*—Kenneth W. Dobyns

[57] ABSTRACT

Modular animal cage system including adaptable gravity sewage system with overall pressure flushing, individual adaptable water supply system, adjustable floor and perch, anti-insect strips, swivel feeding bowl, adjustable doors using hinge adaptor and lock adaptor, cleaning device, adjustable swivel drinking device with water cut-off, and safety spring lock.

13 Claims, 22 Drawing Figures

PATENTED MAY 16 1972

INVENTOR
SIDNEY SACHS

BY Kenneth W. Dobyns

HIS ATTORNEY

INVENTOR
SIDNEY SACHS

INVENTOR
SIDNEY SACHS

BY Kenneth W. Dobyns

HIS ATTORNEY

INVENTOR
SIDNEY SACHS

BY Kenneth W. Dobyns
HIS ATTORNEY

PATENTED MAY 16 1972 3,662,713

INVENTOR
SIDNEY SACHS

BY Kenneth W. Dolyns
HIS ATTORNEY

FIG. 19

MODULAR ANIMAL CAGE SYSTEM

BACKGROUND OF THE INVENTION

1. Field of the Invention

This invention relates to animal cages, and more particularly to animal cages including various plumbing and construction features.

2. Description of the Prior Art

Animal cages have been previously constructed in modular form, but all of the known prior modular cages have certain disadvantages. Some of these prior cages wash the liquid waste, which includes liquid-carried solid waste, from the floor of a cage into an open trough. This open trough then slopes downward through adjacent cages to pick up additional waste from additional cages before discharging the waste at one side of a line of cages. This arrangement is undesirable in that it promotes the spread of waste-carried disease from cage to cage, provides a constantly open path for the movement of insects from one cage to another, and makes the caged animals uncomfortable because of the conflict between the instinctive habit of many animals to mark their "territory" with urine and the constant odor of the urine of other animals in their cages.

The trough system also limits the lateral spread of the cages because the trough must slope downward, requiring each cage to be lower than the adjacent "upstream" cage. There is a limit to the possible vertical displacement between adjacent cages. The trough system also prevents the use of cages of different heights in adjacent stacks of cages. Thus, if a pet store uses adjacent stacks of the prior art cages to keep hampsters and collies, the hampsters must occupy a cage large enough for collies.

The prior art systems must have all plumbing features permanently built into each module because of the inflexible mode of construction of the blocks of modules.

SUMMARY OF THE INVENTION

The present invention solves the drainage problems of the prior art devices by arranging for each cage box to slope downward toward one low point on the floor of the cage, preferably toward one side of the back of the floor. An orifice is located in each box at this low point, and a short pipe is connected to this orifice to drain the liquid waste from the box. A downward (vertical) drain pipe is connected to the short pipe from each of the cages in a stack and drains each cage without allowing the liquid from any cage to pass through any other cage. Each of the drain pipes is connected to a closed waste disposal pipe located near floor level to dispose of the waste. Periodically, water under pressure is forced into one end of the waste disposal pipe to force the liquid sewage into a sewage receiving means, which may be the public sewers. This pressurized flushing promotes greater cleanliness than is possible with an open trough.

An adjustable floor grating and an adjustable perch provide standing areas so that the animals need not stand on the bottom floor of the cage. The cages can be constructed of fiberglass or plastic, sloped inward toward the back so that the gratings can be held in by force fit and be easily removable. Such construction also allows greater cleanliness. The raised floor gratings allow specimen trays to be placed on the lower floor for research animals.

The hinge-and-lock system for the cage doors is arranged to allow the fresh-water pipe system for drinking water and cage-washing water to pass down the front of a stack of cages without being built into the cage walls and without passing through the cage doors. Independently opened swivel nozzles are used to direct the water for cage washing over the floor of the cage.

The extruded posts used to hold the cage modules have recesses to hold a plastic extrusion which holds an anti-insect paste, thereby preventing the spread of insects from one cage to another. The cage doors include a swivelling bowl holder to hold the food above the floor grating while allowing the trays to be easily filled without opening the cage doors.

DESCRIPTION OF THE PREFERRED EMBODIMENT

Figures 1, 20:
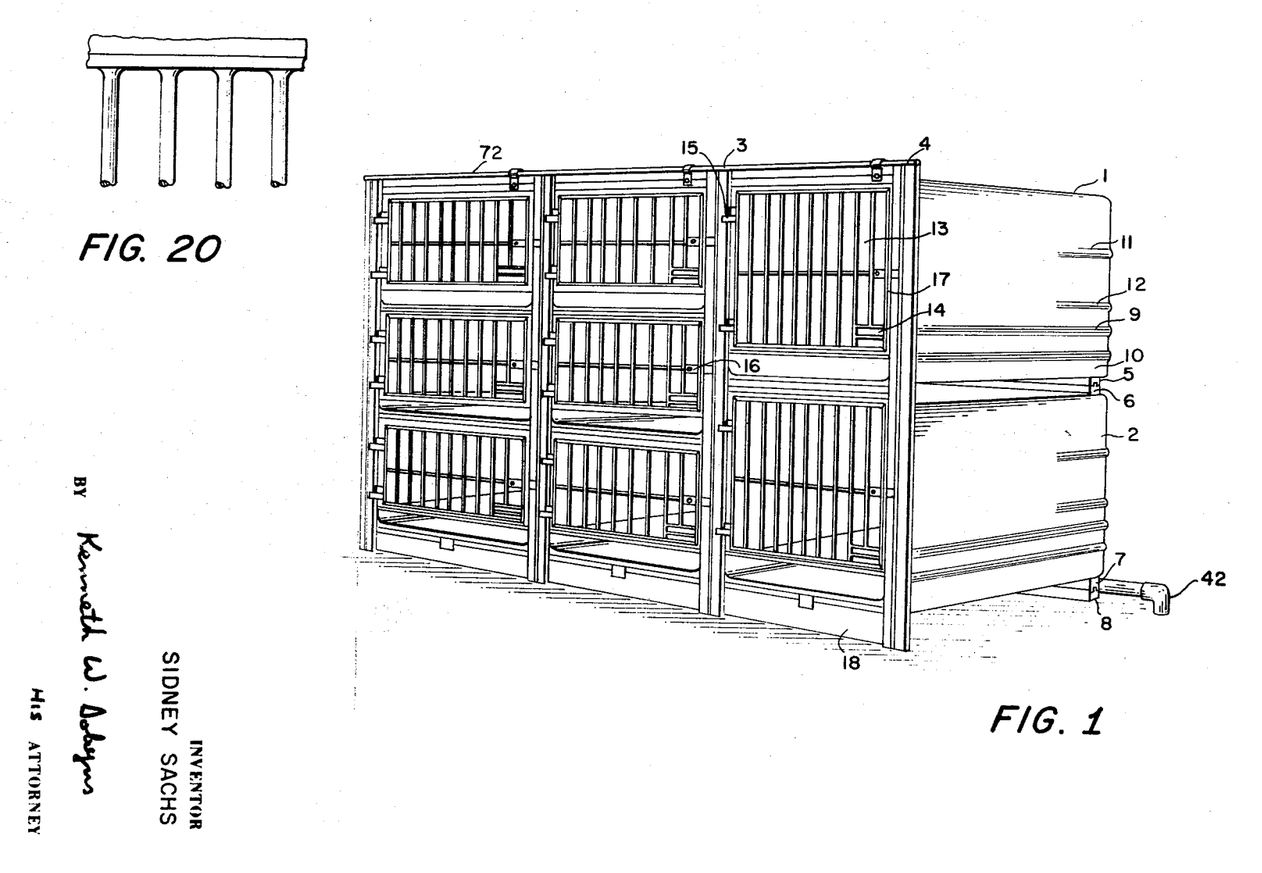
FIG. 1 is an overall perspective view of a cage system.
FIG. 20 is a view of a segment of a cage door.

FIG. 1 is a perspective view of a block of cages according to the present invention. The block of cages includes three adjacent stacks of cages. Cages 1 and 2 are arranged to form one of the three stacks. Each cage is an integral unit, which may be of fiberglass or plastic construction. In the front, each of cages 1 and 2 is fixed in place by attachment to extruded aluminum posts 3 and 4, which are shown in greater detail in other figures. In the rear, wood or molded plastic strips 5, 6, 7, and 8 are arranged to hold the cages in their correct position. Strip 5, for example, is bonded to the bottom rear of cage 1 and strip 6 is bonded to the top rear of cage 2. Interlocking channels on strips 5 and 6 align and separate the cage boxes.

Cage 1 includes external bulges (or internal indentations) 9 and 10 to hold the adjustable floor grating, and bulges ( or indentations) 11 and 12 to hold the adjustable perch grating. The door 13 of cage 1 can be constructed in one piece of cast aluminum, plastic or other metal. A swivel lock feeding bowl 14 is shown in greater detail in FIGS. 16, 17 and 18.

Figure 9:
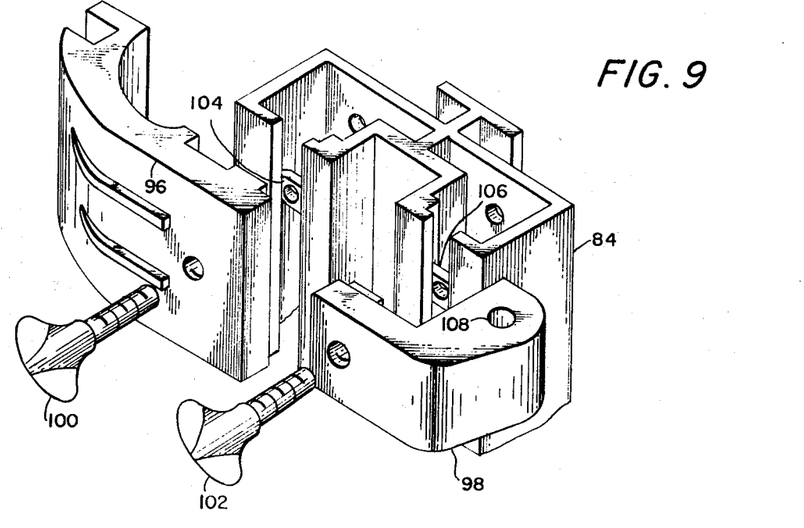
FIG. 9 is a view of a segment of post extrusion with hinge and lock adapters.
Figure 10:
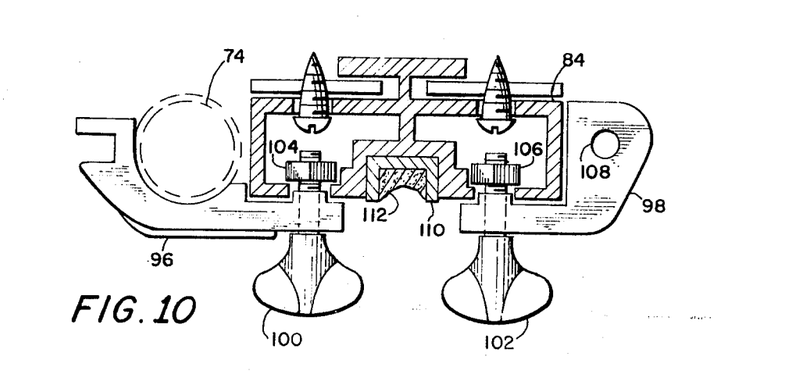
FIG. 10 is a cross-sectional view of the device of FIG. 9.
Figures 11, 12, 13, 14, 15:
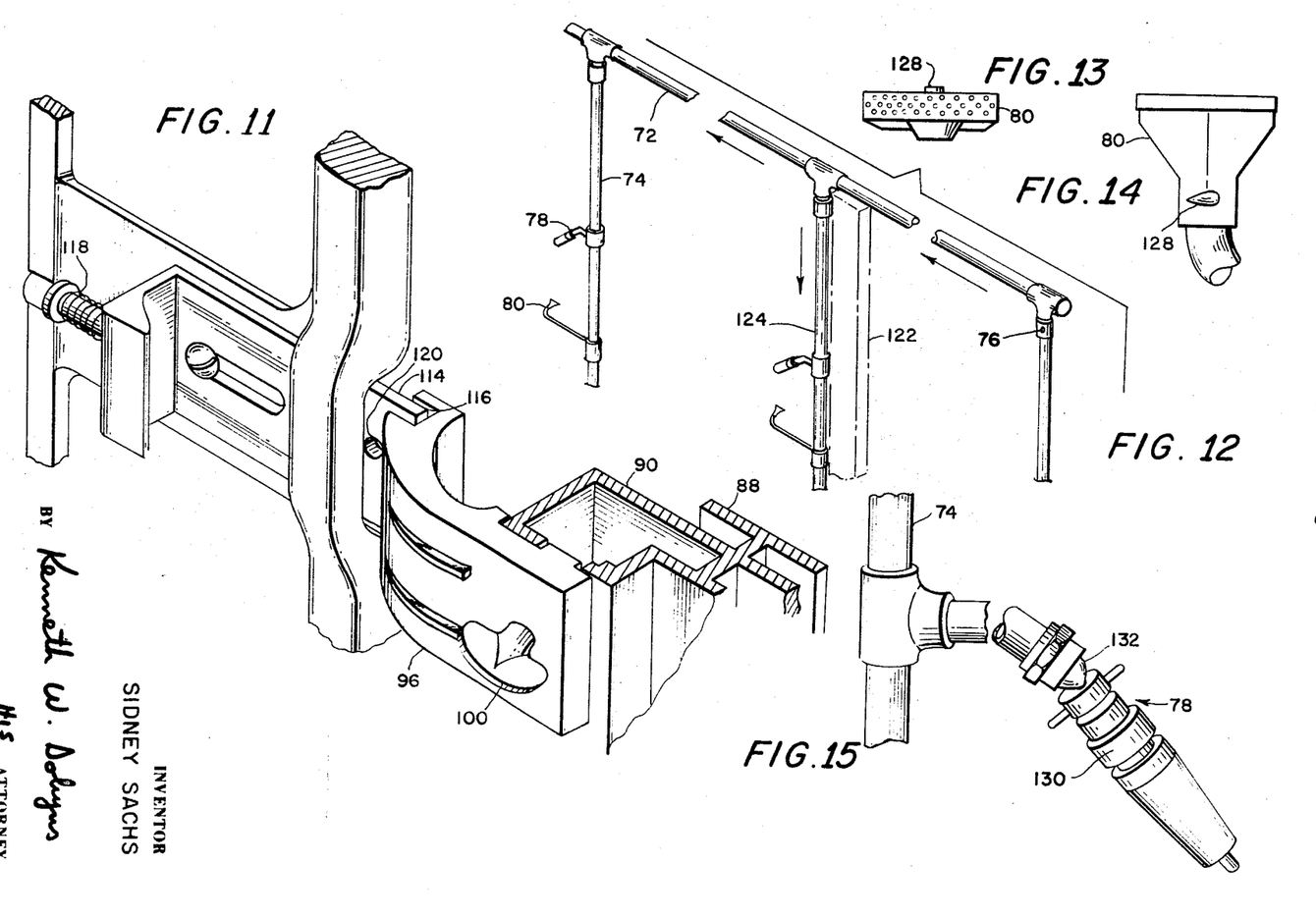
FIG. 11 is a view of the door lock.
FIG. 12 is a representation of the water supply system.
FIGS. 13 and 14 are front and top views of the cage cleaning attachment.
FIG. 15 is a view of the drinking attachment.

Hinge pins 15 and 16 are constructed as part of door 13 and are made to receive the hinge adapter as illustrated in FIGS. 9 and 10. The locking device 17 for the door is illustrated in FIGS. 9, 10 and 11. A front base panel 18 improves the appearance of the block of cages.

Figure 2:
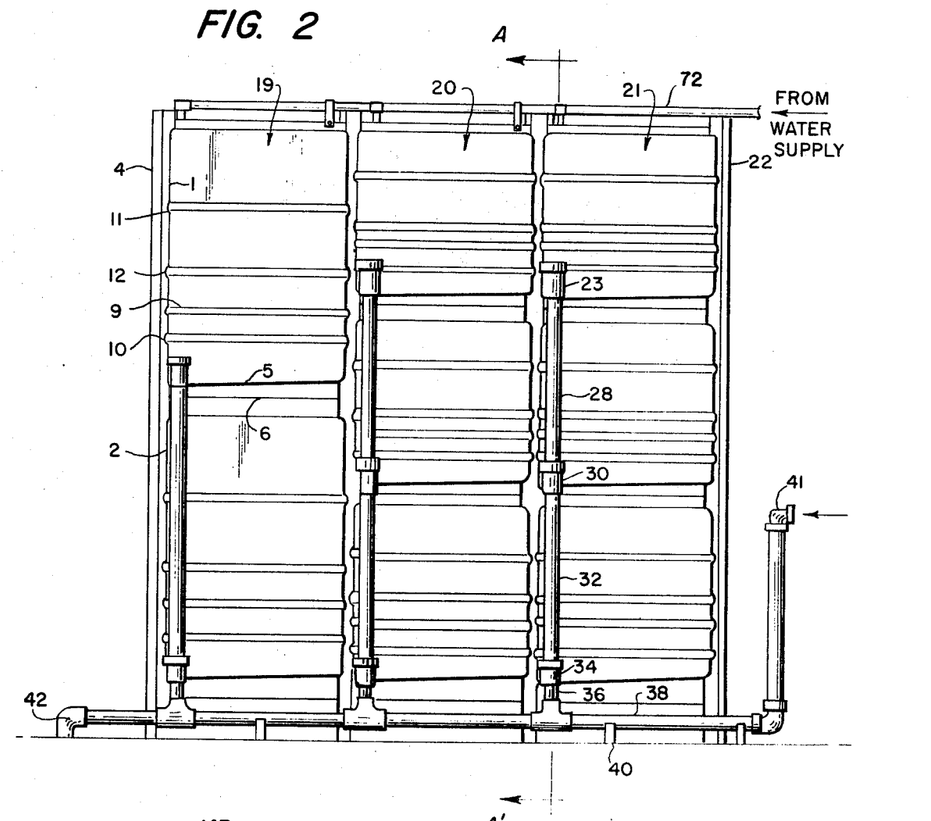
FIG. 2 is a rear view of a cage system.

FIG. 2 is a rear view of the three stacks of cages shown in FIG. 1. Three stacks of cages 19, 20 and 21 are shown. The height of the cages varies. In the illustrated embodiment, two cages in stack 19 have approximately the same total height as three cages in either stack 20 or stack 21. However, the illustrated cage height is shown only for purpose of illustration, it being one of the advantages of this invention that a wide variety of cage heights is possible.

The rear of cage box 22 illustrates the slope of the box floor downward to one side at a point where a drain connection 23 is made. The other cage boxes have similarly sloping bottoms.

Figure 3:
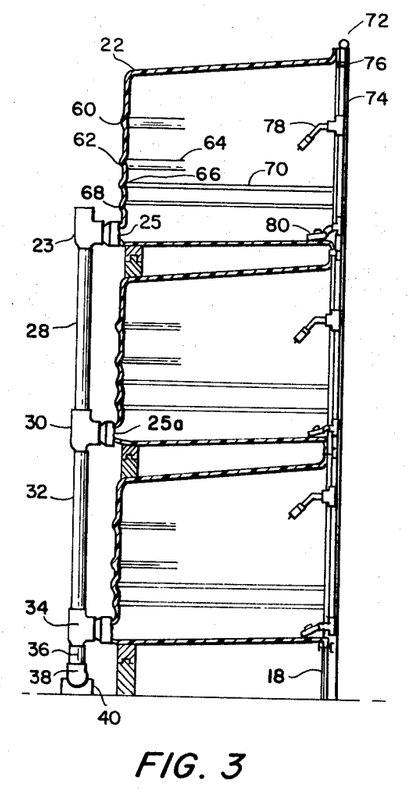
FIG. 3 is a sectional side view of a stack of cages.

FIG. 3 is a partial sectional view of the cages of FIG. 2 taken along line A—A', with the doors removed for clarity of illustration. The bottom of cage box 22 illustrates the slope of the box floor downward to the rear at a point where the drain connection 23 is made. An orifice 25 is formed in the fiberglass material of the cage box and connects into the drain connection in a manner more completely illustrated in FIG. 4. Drain connection 23 feeds into a downwardly directed drain pipe segment 28. All of the drain connections can be made of readily available PVC (poly-vinyl chloride) pipes and fittings, which can be either force fitting or screw fitting connections.

Drain pipe 28 fits into a second drain connection 30, which fits into a second drain pipe segment 32. Segment 32 fits into a third drain connection 34, which fits into a short pipe segment 36. Pipe segment 36 fits into fittings of a lower pipe 38, shown in cross section in FIG. 3. A bracket 40 supports the lower pipe 38.

In FIG. 2, lower pipe 38 is adapted to be periodically washed clean by forcing water in at end 41 to wash the sewage out of pipe 38 into a sewage receiving means (e.g. the public sewers) through end 42. Note that all of the pipe segments specified can be of modular length.

Although FIGS. 2 and 3 show all cages of the same depth, the cage system is easily adapted to the use of cages of different depths. Basically, all that is required to adapt the system to cages of different depths is that the connecting pipe from orifice 25 to drain connection 23 be made of a suitable length to compensate for the different depths of the cages.

Figure 4:
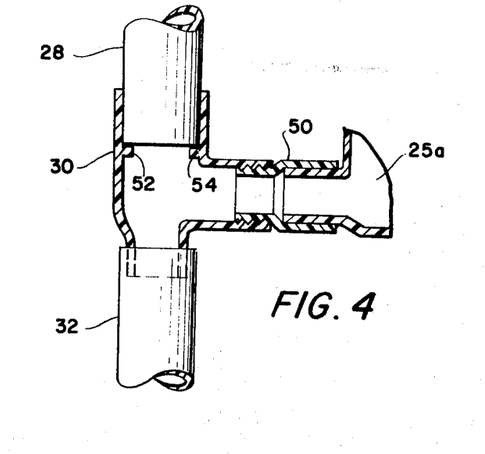
FIG. 4 is an enlarged sectional view of a plumbing feature of FIG. 3.

FIG. 4 is a partial cross-sectional view of the pipe system connecting an orifice 25a to the drain connection 30 through a connecting pipe 50. Drain pipe 28 fits into drain connection 30, being stopped by stop projections 52 and 54.

Figure 5:
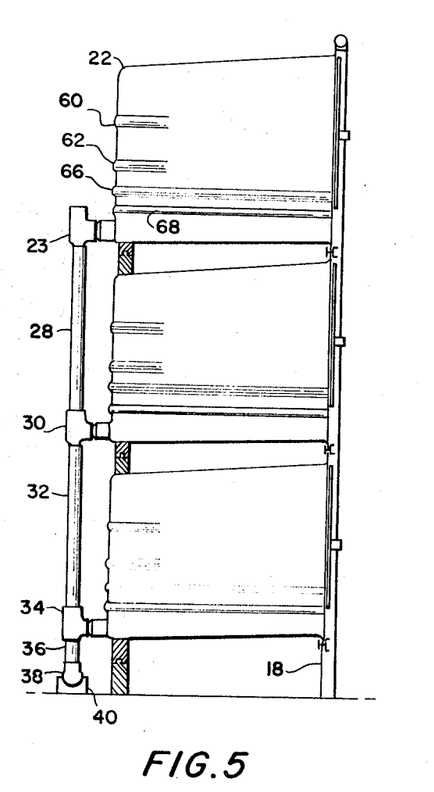
FIG. 5 is a side view of a stack of cages.

FIG. 5 is an end view of the same cage stack shown in FIG. 3. Indentations (or bulges) 60 and 62 in box 22 are adapted to hold a forced-in grating which serves as a perch for the animals. In practice, only one perch is used at one time and is adjustable between heights. The cage box is slightly narrower in the rear than in the front, to thereby hold the perch in place by force-fit. In FIG. 3 is shown the perch 64 fitted into bulge 62.

In FIG. 5 are also shown two lower bulges 66 and 68 in box 22 which are adapted to hold a floor grating by force-fit. The grating is adjustable in height in that it can be placed in either of the bulges 66 and 68. In FIG. 3 is shown the floor grating 70 fitted into bulge 68.

A PVC water supply pipe 72 runs across the top of the cages and supplies water to the cages through a vertical PVC pipe 74. A cutoff valve 76 in pipe 74 allows the water in pipe 74 to be cut off when desired. Pipe 74 is connected to a drinking water outlet 78, more fully illustrated in FIG. 15, which may be of the type described in U.S. Pat. No. 2,939,424. The water is used only when the drinking device is touched by the animal.

Pipe 74 is also connected to a cleaning device 80, more fully illustrated in FIGS. 13 and 14. The cleaning device is connected to the water supply system by a flexible hose and has a pressure spray nozzle with a cutoff valve in each nozzle. The cleaning device is located between the grating and the bottom of the cage, and is used to wash out the bottom of the cage.

Figure 6:
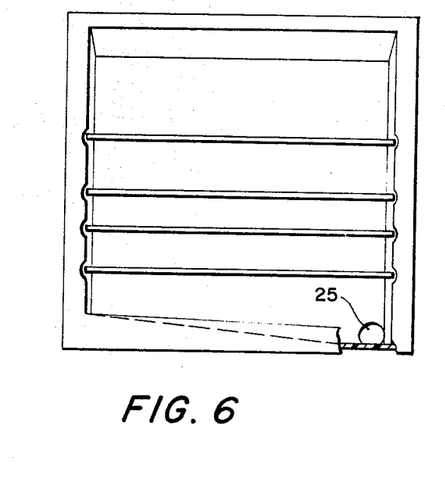
FIG. 6 is a front, partially sectional, view of one cage.

FIG. 6 is a front view of a single cage and illustrates the slope of the floor backward and to one side to orifice 25. It also illustrates the flange all around the front of the box.

Figure 7:
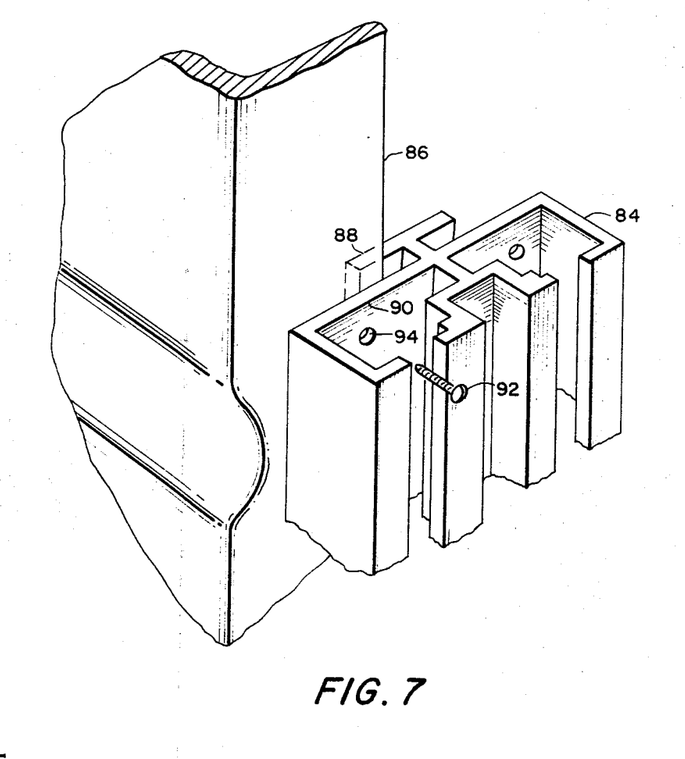
FIG. 7 is a perspective view of a post extrusion for attachment to a cage.
Figure 8:
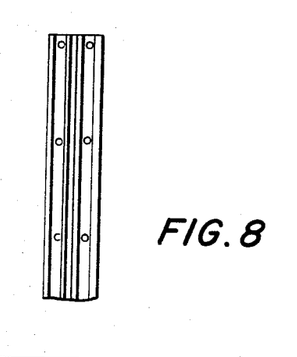
FIG. 8 is a front view of a larger segment of post extrusion.

FIG. 7 illustrates a segment 84 of the aluminum post extrusion which serves to connect and support the individual boxes into a complete system. A side flange 86 of a box fits into an opening between a flange 88 of the extrusion and the main cross piece 90 of the extrusion. A self-tapping screw 92 fits through a predrilled hole 94 into the flange 86 to hold the cage box in place. As illustrated in FIG. 8, holes such as hole 94 are predrilled about every 15 cm. along the length of the extrusion to enable the cage boxes to be readily assembled in any desired arrangement.

FIG. 9 is a perspective view showing the construction of the post extrusion to accept a lock adapter 96 on one side and a hinge adapter 98 on the other side. Both of these adapters are adjustable in position and can be locked by tightening thumb screws 100 and 102, which are respectively attached to nuts 104 and 106. The nuts fit tightly into the extrusion opening to prevent their turning. The adapters can be constructed of aluminum or of plastic. The hinge adapter includes a hole 108 which holds the hinge pins of the cast aluminum cage doors. FIG. 10 is a top view of the post and adapter combination shown in FIG. 9.

In FIG. 10, a plastic insert 110 in the post extrusion is adapted to hold an anti-insect paste. The plastic insert is force fitted into the post and is easily removable for cleaning. The paste prevents insects from passing over the post extrusion from one cage to another.

The lock adapter 96 serves two purposes. First, it holds the vertical water supply pipe 74 in place in a sturdy locked position against the front of the cage, as shown in FIG. 10, thereby allowing the water drinking attachment 78 and the cage cleaning attachment 80 to assume their places inside the cage without passing through either the wall of the cage box or the cage door.

Second, it accepts the door slide bolt 114 in a groove 116, thereby holding the door in a closed position, as illustrated in FIG. 11. The slide bolt 114 is constructed as an integral part of the cast aluminum door and operates under pressure from a spring, which pushes the lock into a secure locked position. A hole 120 is provided through the bolt to accept a padlock, thereby positively locking the door. The bolt may be constructed of plastic or metal.

FIG. 12 is a view of a segment of the water supply system including the upper water supply pipe 72, a vertical water supply pipe 74, a drinking water attachment 78 and a cage cleaning attachment 80. A phantom view shows a post extrusion 122 along another of the vertical water supply pipes 124. FIGS. 13 and 14 are respectively front and top views of the cage cleaning nozzle including a cutoff valve 128. FIG. 15 is a view of a drinking water attachment including a quick release mechanism of a well-known type and a swivel mechanism 132, also well known.

Figure 16:
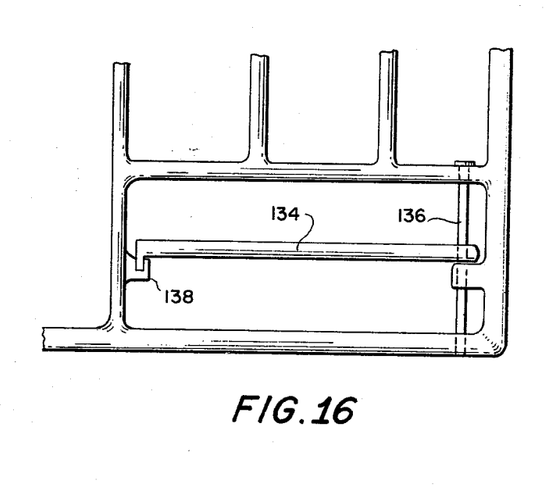
FIGS. 16 and 17 are views of the swivel feeding bowl platform device.
Figure 17:
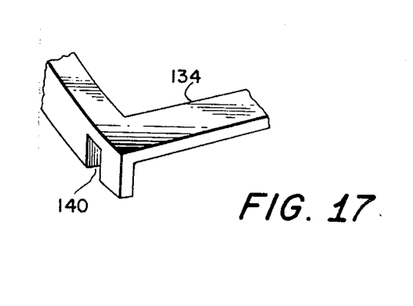

FIG. 16 is a view of a swivel-lock feeding bowl system in a lower corner (the lower right corner as illustrated) of the door. A swivel feeding bowl platform 134 is permanently mounted on a hinge pin 136 in an opening in the door. A tab 138 on the door engages a slot 140 on the swivel platform (see FIG. 17) to hold the platform inside the cage unless the platform is lifted slightly to release it for opening. A corresponding slot 140' on the other side of the platform can hold it open.

Figure 18:
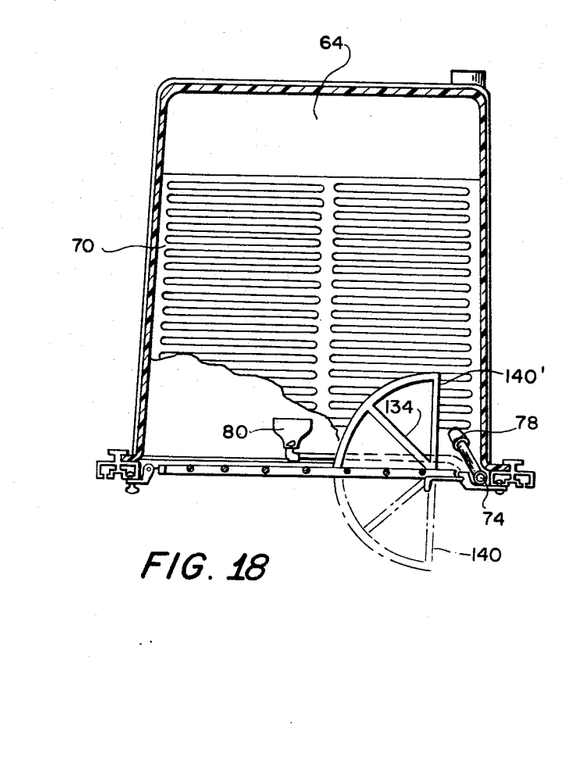
FIG. 18 is a top sectional view of a cage box.

FIG. 18 is a cutaway top view of the cage showing the swivel platform 134 inside the cage in a real view and swiveled outside the cage in a phantom view. When it is outside the cage, food can be placed in the bowls of the feeding bowl platform, and when the platform is swiveled in, the food can be reached by the animals. This figure also illustrates the arrangement of drinking attachment 78 and cleaning attachment 80.

Figure 19:
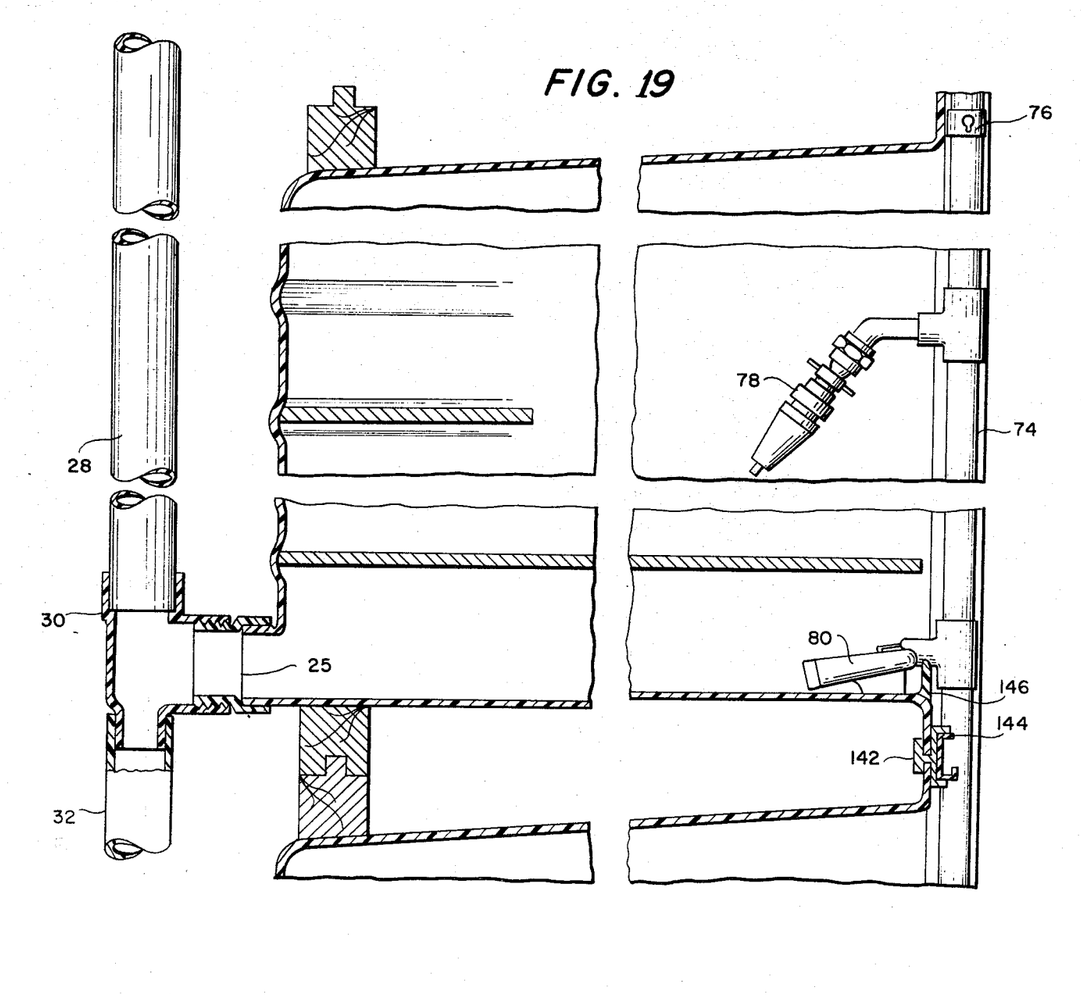
FIG. 19 is a partially broken sectional side view of a cage box.

FIG. 19 is a broken sectional view of one cage box with attachments. A horizontal molding strip 142 is used to align the fronts of vertically adjacent cages and to carry a plastic strip 144 for further anti-insect paste. A plastic ridge 146 can be bonded to the bottom front of the cage box to prevent splashing liquids from coming out of the cage. A specimen tray (not illustrated) can be placed on the floor of the cage for scientific analysis.

Figure 21:
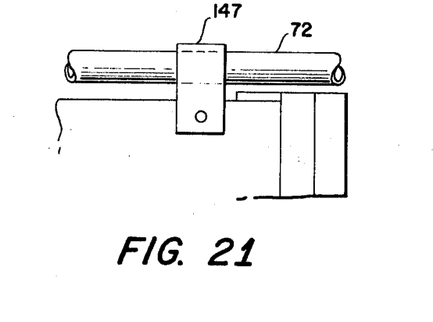
FIG. 21 is a view of a clamp for holding the fresh water supply pipe.
Figure 22:
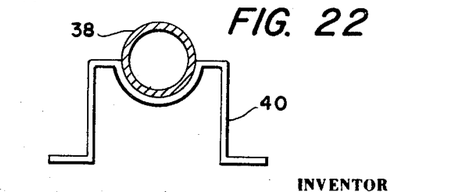
FIG. 22 is a view of the drain pipe support.

FIG. 20 is an enlarged view of a segment of the cage door, illustrating that it is preferably of cast one-piece construction. FIG. 21 is an enlarged view of the top of a cage, showing a bracket 147 holding the water supply pipe 72 in place at the top of the cage. FIG. 22 is an enlarged view of a bracket 40 for supporting the lower drain pipe 38.

Throughout the specification, where plastic, fiberglass, aluminum or other metal is specified for construction of components of the invention, they are specified for illustration only, as a wide variety of materials can be substituted or interchanged to make the invented assembly. Reinforced polyester resin can be used where plastic is specified.

I claim:

1. An animal cage assembly comprising:
  A. a plurality of integrally constructed separate boxes, each box having a front end and a back end and being open on the front end and having a floor so constructed that, when the box is situated in a horizontal position, the floor slopes downward toward one low point of said floor,
  B. means for firmly stacking one of said boxes on top of another of said boxes, each said box being in a horizontal position, C. an orifice through each of said boxes from the inside of each of said boxes to the outside of the boxes and located adjacent to said one low point, D. a downwardly directed drain pipe located outside the stacked boxes and at one end thereof, E. orifice connecting means located outside said boxes for connecting each of said orifices to said drain pipe to cause liquid matter from the floor of each of said boxes to flow through the orifice in that box into said drain pipe, F. an additional stack of said boxes having an additional downwardly directed drain pipe comprising means for draining liquid matter from additional orifices in said additional stack of boxes to the lower end of said additional drain pipe, and G. waste disposal means for receiving said liquid matter from lower ends of both said drain pipes, said disposal means including means to aid draining of said liquid from both said drain pipes.

2. An animal cage assembly according to claim 1 wherein said downwardly directed drain pipe and said additional downwardly directed drain pipe are constructed of modular pipe segments fitted together, each of said segments being of a height predetermined according to the height of the boxes in the respectively corresponding stack of boxes.

3. An animal cage assembly according to claim 1 wherein said waste disposal means comprises:

a. a lower pipe for carrying said liquid arranged to slope downward toward a sewage receiving means and connected at the lower end to empty said liquid into said sewage receiving means, b. means for connecting each of said drain pipes to said lower pipe to transfer said liquid from said drain pipes to said lower pipe, and c. means for forcing additional liquid into an upper end of said lower pipe to flush said lower pipe into said sewage receiving means.

4. An animal cage assembly according to claim 1, wherein the floor of each of said boxes slopes toward one side of the back end of the box and wherein said orifice is located at said one side of the back end.

5. An animal cage assembly according to claim 1 wherein a. each of said boxes slopes inward toward the rear of the box, b. each box having indentations in the side of the box, and c. having gratings adapted to be inserted into each box in selected ones of said indentations to serve as standing areas for said animal, said gratings being held in place by being wedged into said sloping box.

6. An animal cage assembly comprising:

A. a plurality of modular cage boxes, each box having a flange on each side,

B. support means for holding said cage boxes in a stacked arrangement both in front and in back, the support means for the front comprising a pair of post extrusions, one of which is situated on each side of the stacked arrangement of cage boxes, each extrusion having a flange arranged to adjustably interfit with the flanges of said cage boxes, said support means further comprising means to fixedly interfit said flange of each extrusion with one of said flanges of said cage boxes to hold the cage boxes vertically in place in the front, C. lock adapters and hinge adapters, each of said adapters including means for adjustably fitting said adapters onto said post extrusions, and D. a plurality of doors, each of said doors comprising means for holding the door in place in front of respective cage boxes by attachment to respective ones of said lock adapters and said hinge adapters, whereby the doors and the fronts of the cage boxes are supported independently by said post extrusions, said doors being supported by said adapters attached to the post extrusions.

7. An animal cage assembly according to claim 6 wherein at least some of the adapters which hold said doors have a recess on the back side thereof between the door and the post extrusion, and wherein a pipe system for supplying fresh water to the cages includes a vertical supply pipe running down said stack of cages in a direction substantially parallel to said post extrusion and behind said recess.

8. An animal cage assembly according to claim 7 wherein said vertical supply pipe supplies water to a drinking system and a cleaning system inside each cage box.

9. An animal cage assembly according to claim 6 wherein each of said doors includes a spring-biased slide bolt adapted, when said door is closed, to fit into a groove in said lock adapter.

10. An animal cage assembly according to claim 9 wherein said slide bolt includes a hole adapted to accept a padlock, whereby said bolt is positively locked closed.

11. An animal cage assembly according to claim 6 wherein each of said post extrusions has a recess adapted to contain an anti-insect material.

12. An animal cage assembly according to claim 9 further comprising an additional means located between vertically adjacent cages for carrying an anti-insect material.

13. An animal cage assembly according to claim 6 wherein one of said doors includes the improvement comprising:

A. a feeding bowl means mounted at one end thereof to swivel selectively to one side of said door and to the other side of said door, and B. a catch to hold said bowl means in at least one selected position.

* * * * *

UNITED STATES PATENT OFFICE
CERTIFICATE OF CORRECTION

Patent No. 3,662,713            Dated May 16, 1972

Inventor(s)    Sidney Sachs

It is certified that error appears in the above-identified patent and that said Letters Patent are hereby corrected as shown below:

In the address of the inventor, delete "50 Hobart Road" and insert --540 Hobart Road--.

Signed and sealed this 17th day of October 1972.

(SEAL)
Attest:

EDWARD M. FLETCHER, JR.             ROBERT GOTTSCHALK
Attesting Officer                     Commissioner of Patents